United States Patent [19]

Sakamoto

[11] Patent Number: 5,225,857
[45] Date of Patent: Jul. 6, 1993

[54] COLLAPSIBLE GLASSES FRAMES

[75] Inventor: Kazuyuki Sakamoto, Gamagori, Japan

[73] Assignee: Nikon Corporation, Tokyo, Japan

[21] Appl. No.: 705,529

[22] Filed: May 24, 1991

[30] Foreign Application Priority Data

May 30, 1990 [JP] Japan .............................. 2-57012[U]

[51] Int. Cl.⁵ .............................................. G02C 5/08
[52] U.S. Cl. ................................................. 351/63
[58] Field of Search .................. 351/63, 64, 126, 128, 351/76, 77, 88, 137

[56] References Cited

U.S. PATENT DOCUMENTS 1,113,194 10/1914 Carlson ................................ 351/63

FOREIGN PATENT DOCUMENTS 329491 5/1930 United Kingdom .................. 351/63

Primary Examiner—Rodney B. Bovernick
Attorney, Agent, or Firm—Shapiro and Shapiro

[57] ABSTRACT

Disclosed is a collapsible glasses frame having fronts which are spread when used and collapsible when not used, comprising a mechanism for setting a pad member into a predetermined position when the fronts are spread for use, and a mechanism for shifting the pad member when said fronts are folded up, thus enabling the glasses frame to be made more compact.

7 Claims, 5 Drawing Sheets

COLLAPSIBLE GLASSES FRAMES

BACKGROUND OF THE INVENTION

1. Field of the Invention

The present invention relates to glasses frames whose fronts are collapsible when not using them.

2. Related Background Art

The conventional glasses frames of this type employ either a structure in which the front and pads (nose tabs) are integrally formed or a structure in which the pads are screwed to the front.

When the glasses frames having such structure are folded up, the pads integral with the front are also caused to fold down simultaneously. In this case, providing the pads are high, the folding angle is restricted within a certain range to prevent further folding-up, due to the abutment between peaks of left and right pads. In order to solve this problem, there have been made attempts to increase the number of axes for folding up from one to two so as to receive the pads in the space defined by the two axes, or to lower the height of the pads.

However, the prior art has a disadvantage in that the entire configuration becomes thick due to the two axes folding structure, which is unsatisfactory in view of its primary object which is to make them as compact as possible.

With respect to a structure in which the height of the pads is lowered, there arises a problem that the configuration of the pads does not fit noses of the Japanese (Orientals) well, and accordingly the glasses frames slip down, or they are uncomfortable to wear.

SUMMARY OF THE INVENTION

It is the object of the present invention to provide collapsible glasses frames which are comfortable to wear when used and collapsible into compact configuration when not used.

In order to achieve the above objective, a glasses frame in accordance with the present invention having fronts 1 and 2 which are spread for use and collapsible when not used, may comprise:

means (3c, 1c, 2c, 1b, and 4a) for setting pad members (4) to a predetermined position when said fronts are spread for use; and means (3a, 3b, 4b, and 4c) for shifting said pad members (4) from the predetermined position when folding up said fronts.

In the present invention, the pad members are separately formed from the fronts, to thereby allow the pad members to be shifted from the predetermined position for use when they are not used, and hence the folding action of the fronts is not obstructed by the pad members, thus achieving a complete folding.

DETAILED DESCRIPTION OF THE PREFERRED EMBODIMENTS

Figure 1:
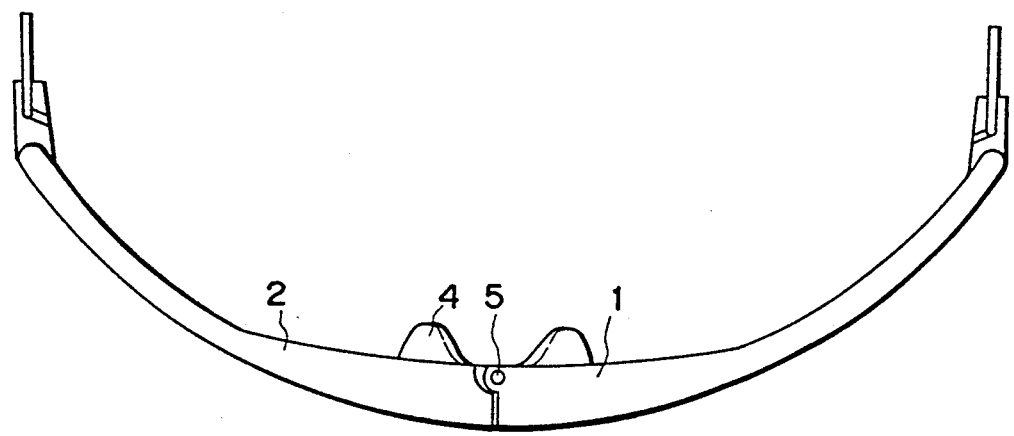
FIG. 1 is a plan view of a collapsible glasses frame embodying the present invention.
Figure 2:
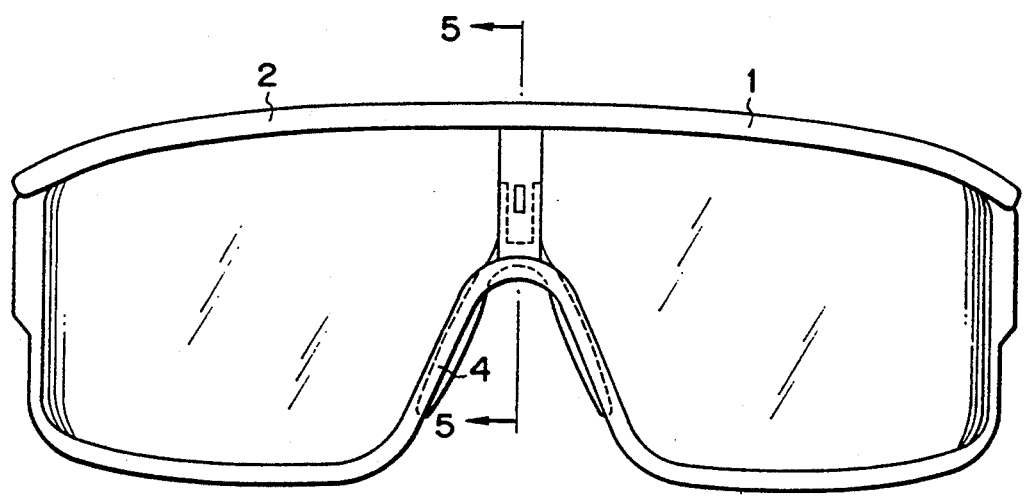
FIG. 2 is a front view of the collapsible glasses frame embodying present invention.
Figure 3:
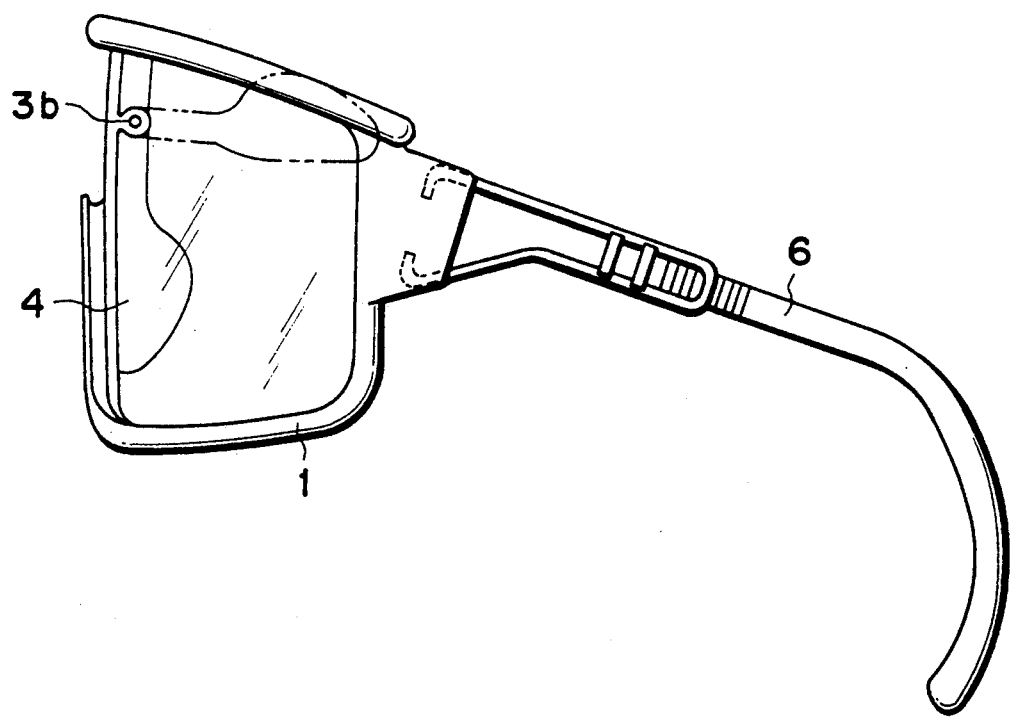
FIG. 3 is a side view of the collapsible glasses frame embodying the present invention.

In the form shown in FIGS. 1-4, the collapsible glasses frame in accordance with the present invention include a left front 1 and right front 2 which are rotated around a pivot 5 to be ready for use. A pad 4 is attached to a pad flip-up hollow shaft (not shown in these figures) which is fitted to the pivot 5. A temple 6 (FIG. 3) is associated with the left front 1 at its outside end so that the rotation of the temple 6 outwardly from the left front 1 is restricted while the inward rotation thereof is freely permitted. Similarly, another temple is, of course, provided on the right front 2 so as to confront the temple 6. The pad 4 is engaged with fitting protrusions (3b in FIG. 3, and 3a not shown) of the pad flipping hollow shaft which engages with the pivot 5 engaging with the left and right front 1, 2, thereby allowing the pad 4 to be flipped up to an angle of the order of 90 degrees as shown in phantom.

Figure 4:
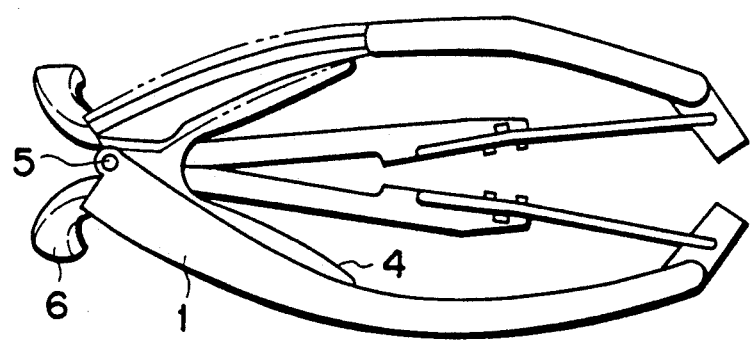
FIG. 4 is a drawing showing a state in which the collapsible glasses frame are folded up.

In order to fold up the thus configured collapsible glasses frame as shown in FIG. 4, the right and left temples are first folded down by rotating them inwardly, and then the left and right fronts 1, 2 are folded down at the pivot 5, through the function of which the pad 4 is sprung up, whereby the entirety of the glasses frame can be folded up into a compact size when not used, thus attaining the object of the present invention.

An embodiment of the present invention will be described in more detail with reference to FIGS. 5 and 6.

Figure 5:
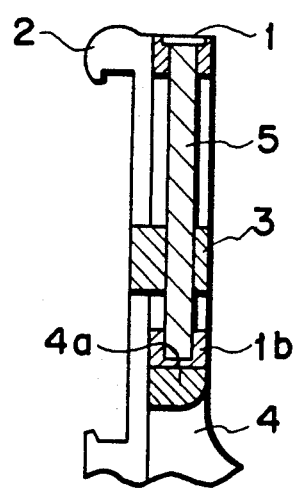
FIG. 5 is a sectional view taken along a line 5—5 in FIG. 2.

FIG. 5 illustrates a mechanism for arranging the pad 4 in the predetermined position at the time of using the glasses. FIG. 6 illustrates the structure of the part of the glasses frame in the vicinity of the pad 4.

Figure 6:
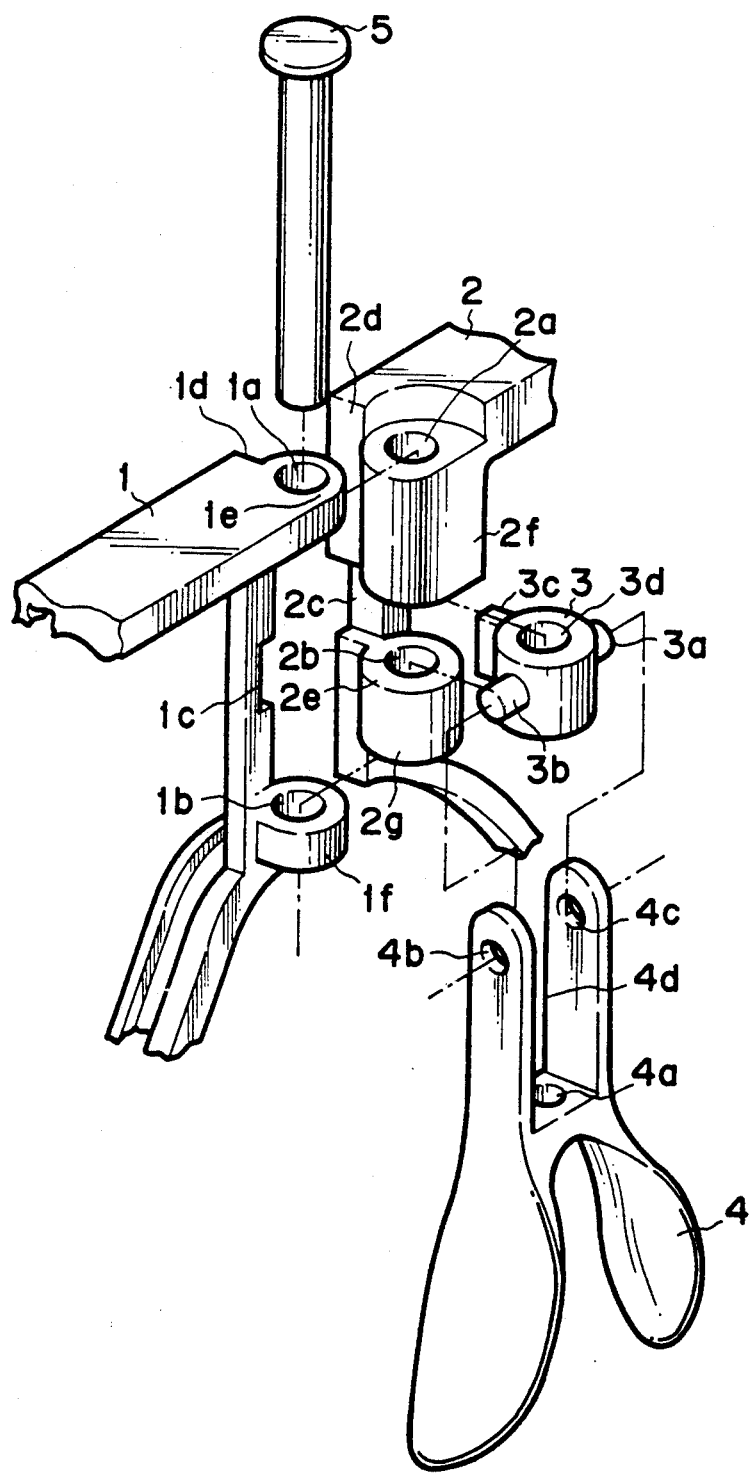
FIG. 6 is an enlarged exploded perspective view illustrating the construction in the vicinity of the pads of the collapsible glasses frame in accordance with the present invention.

In the construction of FIGS. 5 and 6, the left front 1 and the right front 2 have their respective abutment surfaces 1d and 2d, through the abutting of which the spread position of the left and right fronts 1, 2 is determined at the time when the glasses are used. In the rear (that is, a side closer to user's face) of the abutment surface 1d of the left front 1, upper and lower protrusions 1e, 1f are provided to constitute part of the mechanism for folding up the fronts. Similarly, in the rear (a side closer to user's face) of the abutment surface 2d of the right front 2, there are provided upper and lower protrusions 2f, 2g which are fitted into a space formed between the two protrusions 1e, 1f of the left front. Further a pad flip-up hollow shaft 3 is fitted into a space formed between the two protrusions 2f and 2g of the right front 2. The pivot 5 is fitted into fitting holes 1a, 1b, 2a, 2b, and 3d respectively formed in the two protrusions 1e, 1f of the left front 1, two protrusions 2f, 2g of the right front 2, and the pad flip-up shaft 3, to consequently constitute a front folding shaft portion.

On both sides of the pad flip-up hollow shaft 3, there are provided cylindrical fitting protrusions 3a, 3b which are opposed to each other and allowed to be rotatably fitted into fitting holes 4b, 4c provided so as to confront each other at the U-shaped (upper) portion formed on the opposite side to the part abutting the nose when the pad 4 is used. Moreover, on the forward (front direction) side of the pad flip-up hollow shaft 3 perpendicular to the fitting protrusions 3a and 3b, there is provided a protrusion 3c having a rectangular section which is clamped by a rectangle defined by notches 1c, 2c respectively formed on the left and right fronts 1, 2 when the glasses are used. In addition, at the bottom of the U-shape portion formed on the pad 4, there is provided a fall-in protrusion 4a which is permitted to fall into the fitting hole 1b of the left front 1 by the rotation of the pad 4 around the fitting protrusions 3a, 3b of the pad flip-up hollow shaft.

As will be appreciated from the description above, the clamping of the protrusion 3c executed through the rectangle defined by the notches 1c, 2c of left and right front 1, 2 and the falling-in of the fall-in protrusion 4a into the fitting hole 1b of the left front 1, determine in cooperation the position of the pad during the use of the glasses.

The action of the pad shifting from the predetermined position at the time when being used to a position at the time when folded up, will next be described with reference to FIGS. 6 and 7.

Figure 7:
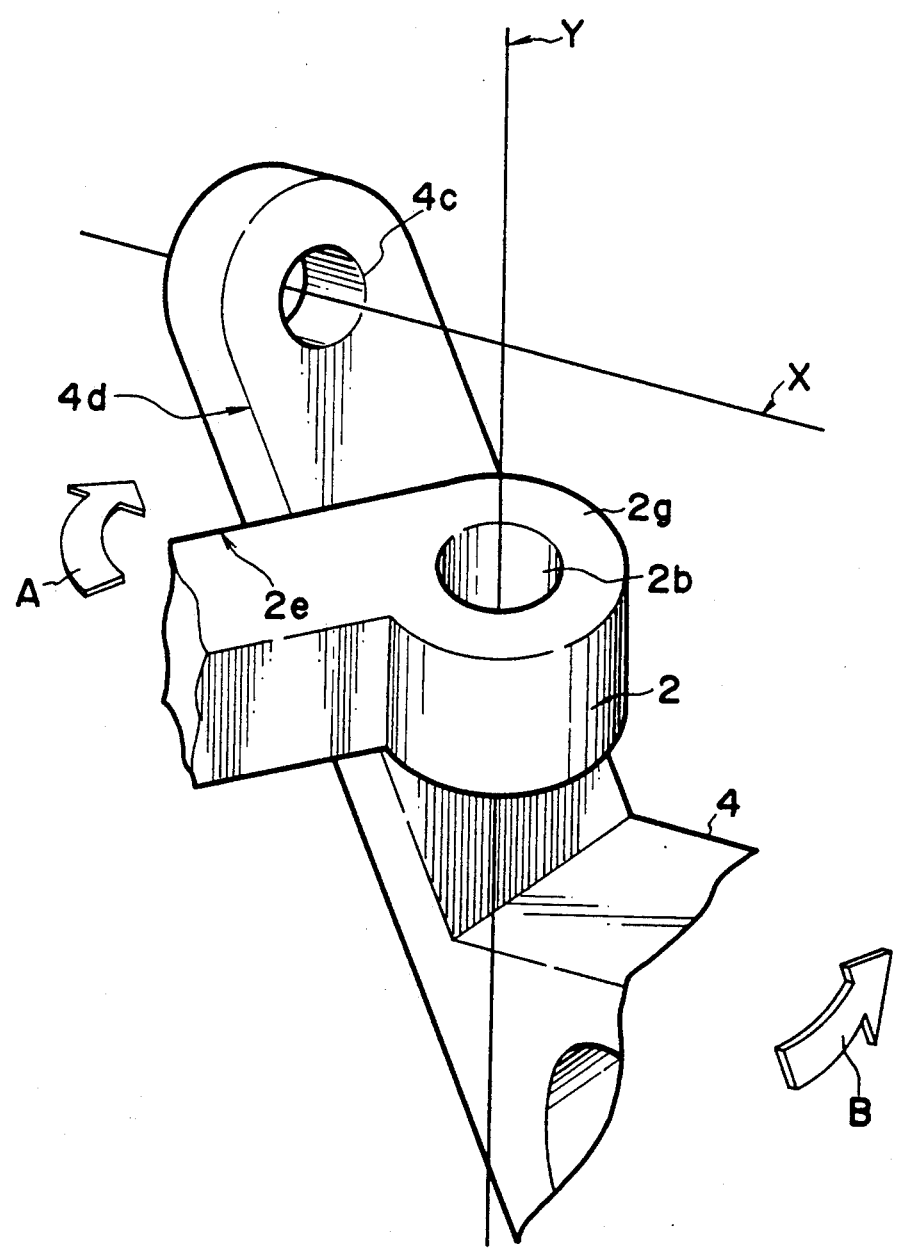
FIG. 7 is a diagram for illustrating the principle of positional shift through a flip-up motion of the pads.

In FIG. 7, Y denotes an axis of the pivot 5, and X denotes an axis of the fitting protrusions 3a, 3b. When the protrusion 2g of the right front 2 is rotated around the axis Y in the direction as shown by an arrow A to fold up the front 2, a ridge (edge) 2e of the protrusion 2g pushes a ridge (edge) 4d of the inside of the U-shaped portion of the pad 4, with the result that the pad 4 is rotationally shifted around the axis X in the direction of an arrow B. Consequently, the pad is caused to flip-up and the fronts fold up easily, thus enabling the glasses to be made more compact.

In the present embodiment, each member is manufactured through an injection molding by the use of thermoplastic elastomer. However, the material and processing method are not limited to those, and any material and processing method suitable for the glasses frames are acceptable.

Further, in order to set the pad into a predetermined position at the time of use of the glasses, the rectangular protrusion 3c is clamped by the rectangular portion, but this shape is not exclusive. For example, a triangular or cylindrical shape may also be used.

According to the present invention as described above, when the fronts are folded up, the position of the pad can be freely shifted toward the predetermined direction, whereby the fold-up action of the fronts is not obstructed, leading to the effects that the glasses frame is easily made more compact. In addition, without the restriction on the pad shape as in the prior art, the design freedom of the pad shape is increased.

What is claimed is:

1. A collapsible glasses frame having left and right fronts which are spread when used and collapsible by folding when not used, comprising:
    means for setting a pad member into a predetermined position when said fronts are spread for use, and
    means for shifting said pad member from said predetermined position when said fronts are folded,
    wherein said setting means includes notches respectively formed on the left and right fronts, a protrusion formed on a side surface of a pad flip-up hollow shaft and clamped by said notches when the glasses are used, a fall-in protrusion formed at the bottom of a U-shape portion formed on said pad member, and a fitting hole on one said fronts for receiving said fall-in protrusion at the time of use of the glasses.

2. A collapsible glasses frame having left and right fronts which are spread when used and collapsible by folding when not used, comprising:
    means for setting a pad member into a predetermined position when said fronts are spread for use, and
    means for shifting said pad member from said predetermined position when said fronts are folded,
    wherein said shifting means includes cylindrical fitting protrusions formed on both sides of a pad flip-up hollow shaft so as to confront each other, and fitting holes which are provided facing each other on a U-shaped portion formed on a part of said pad member opposite to a part thereof that rests on the nose of a wearer at the time of use of the glasses and which are rotatably engaged with said fitting protrusions.

3. A collapsible glasses frame having left and right fronts which are spread when used and collapsible by folding when not used, comprising:
    means for setting a pad member into a predetermined position when said fronts are spread for use, and
    means for shifting said pad member from said predetermined position when said fronts are folded,
    wherein a front folding shaft portion includes first, second, and third fitting holes respectively formed on the left front, the right front and a pad flip-up shaft, and a shaft which is fitted into each of said fitting holes.

4. A collapsible glasses frame according to claim 3, wherein said shifting means includes cylindrical fitting protrusions formed on both sides of a pad flip-up hollow shaft so as to confront each other, and fitting holes which are provided facing each other on a U-shaped portion formed on a part of said pad member opposite to a part thereof that rests on the nose of a wearer at the time of use of the glasses and which are rotatably engaged with said fitting protrusions.

5. A collapsible glasses frame, comprising:
    a left front and a right front,
    a pad member for resting on the nose of a wearer,
    means rotatably connecting said left and right fronts such that they may be rotated relative to one another about a top-to-bottom axis of the frame to fold said fronts to a collapsed position from a spread position in which the glasses are used, and
    means connecting said pad member to said fronts and for causing said pad member to rotate, from a position in which said pad member rests on the nose of the wearer during use of the glasses, about a left-to-right axis of the frame as the fronts are folded, such that said pad member is shifted so as not to obstruct the folding of said fronts.

6. A collapsible glasses frame according to claim 5, further comprising means for setting said pad member at a predetermined position when said fronts are spread for use.

7. A collapsible glasses frame according to claim 6, wherein said fronts have portions with respective holes aligned on said top-to-bottom axis, said means connecting said pad member to said fronts includes a pad member support having a hole aligned on said top-to-bottom axis, a pin member which is received in all of the aforesaid holes, and said pad member support and said pad member have cooperable protrusion-in-hole connection means supporting said pad member for rotation on said left-to-right axis.

* * * * *